S. G. NOTTAGE.
LIQUID RHEOSTAT.
APPLICATION FILED DEC. 13, 1919.
1,387,509.
Patented Aug. 16, 1921.
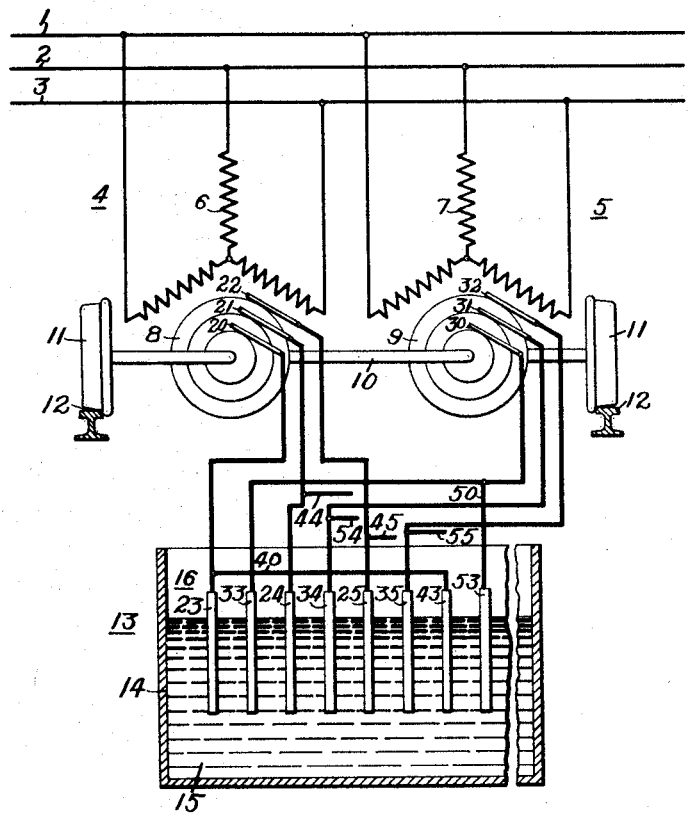
WITNESSES:
J. A. Helsel.
W. P. Coley
INVENTOR
Stanley G. Nottage.
BY
ATTORNEY

UNITED STATES PATENT OFFICE.

STANLEY G. NOTTAGE, OF MURRAYSVILLE, PENNSYLVANIA, ASSIGNOR TO WESTINGHOUSE ELECTRIC & MANUFACTURING COMPANY, A CORPORATION OF PENNSYLVANIA.

LIQUID RHEOSTAT.

1,387,509.     Specification of Letters Patent.     Patented Aug. 16, 1921.

Application filed December 13, 1919. Serial No. 344,588.

*To all whom it may concern:*

Be it known that I, STANLEY G. NOTTAGE, a citizen of the United States, and a resident of Murraysville, in the county of Westmoreland and State of Pennsylvania, have invented a new and useful Improvement in Liquid Rheostats, of which the following is a specification.

My invention relates to control apparatus and it has special relation to liquid rheostats for governing polyphase electric railway motors or the like.

It is undesirable to connect the rotor circuits of polyphase machines in direct parallel relation and regulate such circuits by means of a common liquid rheostat and set of plates since, in that case, a flashover between plates results in a dead short-circuit between corresponding pairs of phases on all machines. It is the chief object of my invention, therefore, to intermingle the two sets of plates to reduce the intensity of the effects of a flashover by diminishing the tendency to cause such action and by also inherently interposing a certain increased amount of liquid resistance between plates to limit the current flow.

A further object of my invention is to provide a single liquid rheostat for governing the secondary circuits of a plurality of polyphase induction motors, for example, that are adapted to drive a common load, the rheostat comprising a plurality of electrodes that are connected to the respective phases of the machines and are progressively arranged in alternation.

Other objects of my invention will become evident from the following detailed description taken in conjunction with the accompanying drawing, wherein the single figure is a diagrammatic view of a polyphase motor-control system organized in accordance with my present invention.

Referring to the drawing, the system here shown comprises a three-phase supply circuit, which may be derived from a single-phase trolley through the medium of a phase-converter, for supplying energy to a plurality of locomotive-propelling motors 4 and 5 that respectively comprise three-phase stator windings 6 and 7 and three-phase rotor windings 8 and 9 that are mechanically connected to drive a common load, such as a truck axle 10, the outer ends of which are suitably journaled in wheels 11 that run along track rails 12.

For the purpose of controlling the operation of the induction motors 4 and 5, a single liquid rheostat 13 is provided. This rheostat may be of any well-known type, in general, preferably of the continuous-flow type, wherein the liquid height is varied to adjust the amount of resistance. However, for the sake of simplicity, the rheostat is illustrated as comprising merely a containing tank 14 for a body of electrolyte 15 and a plurality of plates or electrodes 16 that are adapted for variable immersion in the electrolyte to correspondingly vary the resistance in the secondary circuits of the induction motors and thereby control the speed thereof.

The rotor 8 of the propelling motor 4 is provided with a plurality of slip-ring-engaging brushes 20, 21 and 22 which are respectively connected to plates or electrodes 23, 24 and 25 in the rheostat 13. In a similar manner, corresponding slip-ring-engaging brushes 30, 31 and 32 are electrically connected to plates or electrodes 33, 34 and 35. It will be noted that the corresponding phase-plates are progressively arranged in alternation, that is to say, in the order 23, 33, 24, 34, 25, 35. The purpose of this intermingling or sandwiching of the corresponding phase-plates of the respective sets has already been explained.

In case it is desired to increase the capacity of the rheostat by the addition of further electrodes, such addition may readily be made in the illustrated manner by disposing a series of plates similar to that enumerated to the right of the plate 35. Thus, conductor 40 serves to connect plate 23 and an additional electrode 43, while conductor 50 serves to connect the plate 33 and a new electrode 53. In a similar manner, conductors 44, 54, 45 and 55 may be employed to connect plates 24, 34, 25 and 35, respectively, to additional electrodes.

It will be seen that the plate arrangement described above not only tends to reduce the number and intensity of flashovers between phases, but makes for a more compact rheostat, since there is no dead or inactive space between the plates, as would be the case if separated groups of electrodes corresponding to the respective machines were employed.

It will, however, be necessary, in the present instance, to maintain a certain phase relation between the corresponding phases of the two motors, but not such a strict relation as would be necessary if the rotors were connected in straight parallel relation. This maintenance of phase relation may be provided, for example, by rigidly positioning the rotors 8 and 9 on the shaft 10 in definite relative mechanical positions which will, of course, be permanently maintained during the locomotive operation.

The reason for maintaining such definite phase relations between the motor phases in question will become evident from the fact that, if the current, at any instant in the rheostat, is simultaneously flowing from plate 23 to plate 24 and from plate 34 to plate 33, it follows that there is no resultant current and, therefore, no voltage drop between the intermediate plates 33 and 24. Consequently, the effective resistance of the body of electrolyte is changed by such action and, unless definite phase relations are maintained, unequal loading of the motor phases will result.

I do not wish to be restricted to the specific circuit connections or arrangement of parts herein set forth, as various modifications thereof may be made without departing from the spirit and scope of my invention. I desire, therefore, that only such limitations shall be imposed as are indicated in the appended claims.

I claim as my invention:

1. A polyphase liquid rheostat comprising a plurality of sets of plates, said sets corresponding to different motors, the various phase-plates of said sets being progressively disposed in alternation.

2. A polyphase liquid rheostat comprising a plurality of sets of different-phase electrodes, said sets corresponding to different translating devices, the corresponding phase-electrodes of said sets being progressively disposed in alternation.

3. A three-phase liquid rheostat comprising two sets of different-phase electrodes 23, 24, 25 and 33, 34, 35, said sets corresponding to different motors, the electrodes being arranged in side-by-side relation in the order 23, 33, 24, 34, 25, 35.

4. Control apparatus for polyphase dynamo-electric machines adapted to drive a common load comprising a plurality of rheostat plates connected to the respective phases of said machines and progressively arranged in alternation.

5. Control apparatus for polyphase dynamo-electric machines adapted to drive a common load comprising a single liquid rheostat having a plurality of electrodes connected to the respective phases of said machines and progressively arranged in alternation.

6. Control apparatus for polyphase dynamo-electric machines adapted to drive a common load comprising a single liquid rheostat having a plurality of sets of electrodes 23, 24, 25 and 33, 34, 35, respectively corresponding to the several phases of said machines and arranged in side-by-side relation in the order 23, 33, 24, 34, 25, 35.

7. The combination with a plurality of polyphase dynamo-electric machines, of a single polyphase liquid rheostat therefor comprising a plurality of sets of plates, the various phase-plates of said sets being progressively arranged in alternation, and means for maintaining definite phase relations between corresponding phases of the machines.

8. The combination with a plurality of polyphase dynamo-electric machines adapted to drive a common load, of a single polyphase liquid rheostat having a plurality of electrodes connected to the respective phases of said machines and progressively arranged in alternation, and means for maintaining definite phase relations between corresponding phases of the machines.

In testimony whereof I have hereunto subscribed my name this 29th day of November, 1919.

STANLEY G. NOTTAGE.